United States Patent
LoGalbo et al.

(10) Patent No.: US 8,046,016 B2
(45) Date of Patent: Oct. 25, 2011

(54) INDICATING AVAILABILITY OF RF RESOURCES AT A PEER BASE STATION IN A TWO-WAY PEER-TO-PEER COMMUNICATION SYSTEM

(75) Inventors: Robert D. LoGalbo, Rolling Meadows, IL (US); Bradley M. Hiben, Glen Ellyn, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 467 days.

(21) Appl. No.: 12/199,338

(22) Filed: Aug. 27, 2008

(65) Prior Publication Data

US 2010/0056193 A1 Mar. 4, 2010

(51) Int. Cl.
*H04Q 7/20* (2006.01)
(52) U.S. Cl. ............... 455/511; 455/412.2; 455/518; 455/519; 455/528; 455/434; 370/329; 370/450; 370/454; 370/459
(58) Field of Classification Search .......... None
See application file for complete search history.

(56) References Cited

U.S. PATENT DOCUMENTS

| 5,771,352 | A | * | 6/1998 | Nakamura et al. | 709/227 |
| 7,103,371 | B1 | | 9/2006 | Liu | |
| 7,616,606 | B2 | * | 11/2009 | Gerhardt et al. | 370/329 |
| 7,853,286 | B2 | * | 12/2010 | Ryu et al. | 455/524 |
| 2002/0136183 | A1 | | 9/2002 | Chen et al. | |
| 2006/0068779 | A1 | * | 3/2006 | Nisbet | 455/432.1 |
| 2007/0129080 | A1 | * | 6/2007 | Okuda et al. | 455/452.1 |
| 2007/0274280 | A1 | | 11/2007 | Haas et al. | |
| 2008/0032699 | A1 | * | 2/2008 | Jang et al. | 455/452.1 |
| 2008/0170544 | A1 | | 7/2008 | Tang et al. | |
| 2009/0325578 | A1 | * | 12/2009 | Li et al. | 455/436 |

FOREIGN PATENT DOCUMENTS

GB 2423892 A1 9/2006

OTHER PUBLICATIONS

PCT International Search Report Dated Jan. 4, 2010.
ETSI TR 102 398 V1.1.2, Electromagnetic Capability and Radio Spectrum Matters (ERM); Digital Mobile Radio (DMR); General System Design; May 2008; Sections 4, 5.1, 6.1, 6.2.2, 8, 8.1, 8.11.3.2.

* cited by examiner

*Primary Examiner* — Tuan Pham
*Assistant Examiner* — Fanghwa Wang
(74) *Attorney, Agent, or Firm* — Randi L. Karpinia; Daniel R. Bestor

(57) ABSTRACT

A method for indicating availability of outbound RF resources (ORFRs) of peer base stations is provided that uses peer busy indicator (PBI) messages transmitted from one peer base station to other peer base stations.

20 Claims, 6 Drawing Sheets

INDICATING AVAILABILITY OF RF RESOURCES AT A PEER BASE STATION IN A TWO-WAY PEER-TO-PEER COMMUNICATION SYSTEM

FIELD OF THE DISCLOSURE

The present disclosure relates generally to wide area communication networks and more particularly to methods and apparatus for wireless peer-to-peer communications implemented over a wide area network.

BACKGROUND

Multi-site land mobile radio systems typically utilize leased communication lines to interconnect radio repeater infrastructure devices (e.g., fixed base stations) with a central call control server. The recurring costs of the leased communication lines, as well as the capital investment required to deploy multiple radio repeater infrastructure entities and a specialized call control server can result in relatively high system costs. Multi-site land mobile radio systems are primarily utilized to provide emergency communications to police officers, fire fighters and other emergency responders.

Professional and commercial entities, such as retail store chains, school systems, utilities companies, transportation companies and construction companies, can also benefit from the use of multi-site land mobile radio systems but, due to the recurring costs and the required capital investment, such entities generally do not deploy such systems. Companies who operate over large geographic areas or in different regions may require hundreds or even thousands of fixed radio repeater base stations to implement a suitable multi-site wide area land mobile radio system. Moreover, such a system would require multiple central call servers, which themselves would need to be connected over separate leased lines, thus creating significant additional operational expenses.

One alternative for enabling peer-to-peer communications between users of such entities are two-way radio dispatch systems designed to operate over a wide area network (WAN). The two-way radio dispatch system includes multiple sites distributed over a wide area. At each physical site a minimal complexity base station is provided. Each base station can locate and establish connections to other peer base stations deployed at other physical sites directly over the Internet (or other WAN). As such, the peer base stations can communicate with each other over an Internet Protocol (IP) network without communicating through a centralized call control center, such as a Mobile Switching Center (MSC), or public telephone network, etc. This greatly reduces the costs for the entities that purchase the base stations devices to set up a two-way radio dispatch system. Once the peer base stations have established a connection with one another other over the Internet, the infrastructure for setting up a two-way radio dispatch system is deployed, and wireless communication devices located at one particular physical site can then communicate (via the base station) with other wireless communication devices located at the other physical sites. Industries including transportation, education, construction, manufacturing, energy and utilities, private security, government, hospitality, retail, and many others are finding that these two-way radio systems are relatively easy and inexpensive to deploy, and that they can improve efficiency, worker productivity and responsiveness by allowing mobile teams to share business and customer information instantly.

In many cases, such two-way radio systems support group communication or "group call" functionality for allowing simultaneous communications to a group of mobile wireless communications devices (WCDs). However, problems can arise when the number of communication groups attempting to simultaneously communicate with a base station exceeds the maximum number of inbound radio frequency (RF) resources (IRFRs) available at the base station. For instance, base stations used in some two-way radio systems can only simultaneously support inbound communications of a small fixed number (e.g., two or four) of communication groups using different RF sub-channels or different time slots within of a particular RF sub-channel. Also base stations used in some two-way radio systems can only simultaneously support outbound communications of a small fixed number of communication groups using different RF sub-channels or different time slots within of a particular RF sub-channel. In such a system, if the number of simultaneous group communications exceeds the fixed number of outbound RF resources (ORFRs) at a site, then there will not be RF resources for at least one of the group communications and end-users might mistakenly believe that their group communications are successfully completed when there are not adequate RF resources to support them.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
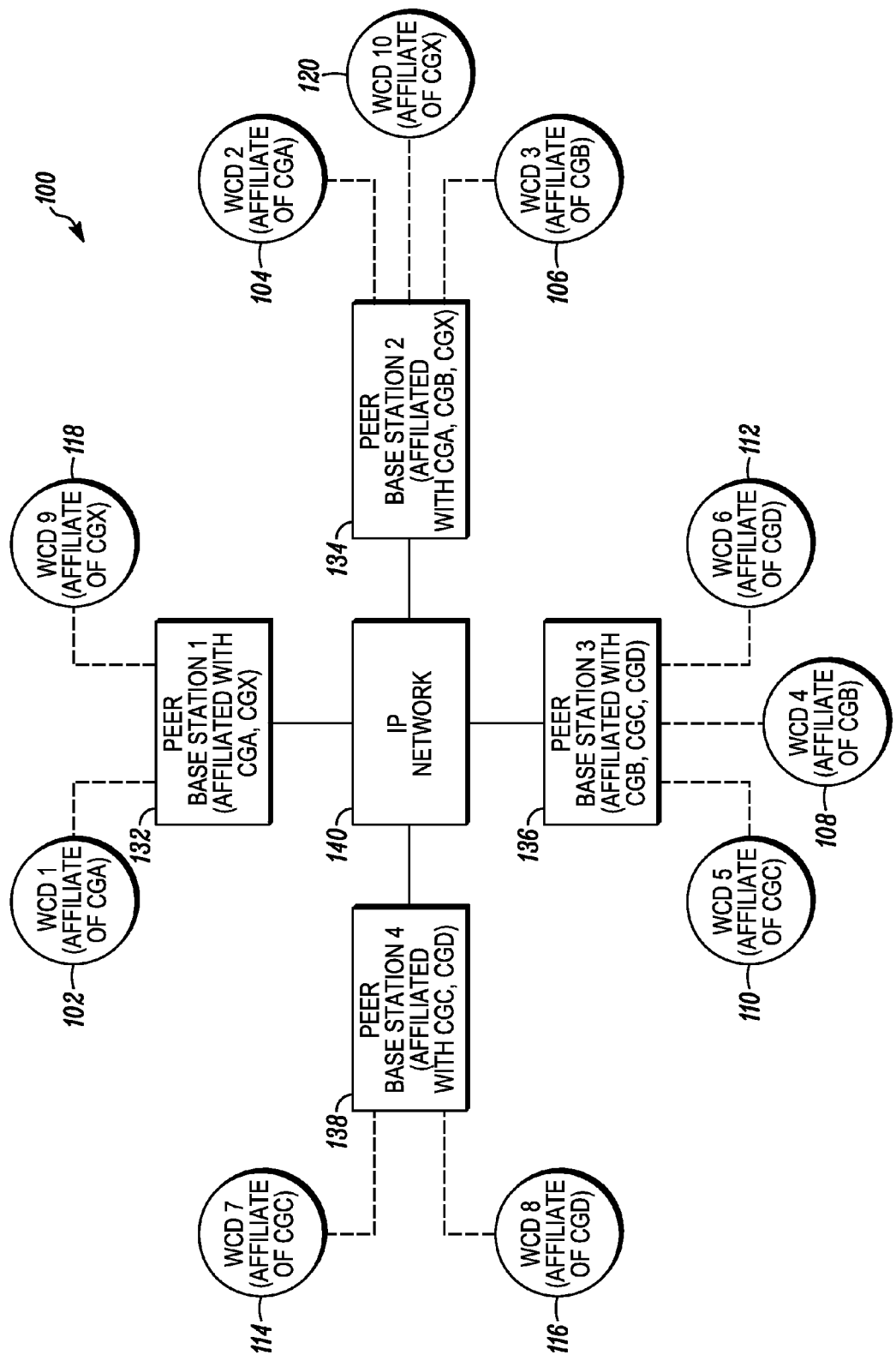
FIG. 1 is a block diagram which illustrates a wide area peer-to-peer (WAPP) communications network used to implement a two-way peer-to-peer communication system that includes a plurality of peer base stations coupled to one another over an IP network, and a plurality of mobile wireless communication devices (WCDs)

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments of the present invention generally relate to group communications in a two-way peer-to-peer communication system comprising a plurality of peer base stations. In such systems, each WCD registers with a particular peer base station such that any communications to/from the WCD pass through that particular peer base station. Each WCD can be "affiliated" with a particular communication group, and each peer base station is also affiliated with all communication groups to which its registered WCDs are affiliated. As such, each of the peer base stations can be affiliated with one or more communication groups. The peer base stations regularly broadcast, to each of the other peer base stations in the network, information regarding (1) identifiers of their registered WCDs and (2) communication group identifiers for each communication group that the peer base station is affiliated with. This way, each of the peer base stations is aware of other peer base stations that have common group affiliations, and when a particular peer base station receives a group communication from one of its registered WCDS, the particular peer base station can then forward that group communication to other peer base stations that are also affiliated with that particular communication group. The other peer base stations can then transmit that group communication to their registered WCDs that are also affiliated with the particular communication group.

When WCDs belonging to a particular communication group are distributed at different peer base stations in a peer-to-peer wide area network, it is undesirable if a group communication transmitted by one WCD can not be received by all WCDs belonging to that particular communication group.

Techniques are provided for blocking inbound RF communications at peer base stations that share a common group affiliation when one or more WCDs belonging to the particular communication group can not receive the group communication. According to one implementation of these techniques, when a first peer base station receives a group communication from one of its registered WCDs that consumes a last remaining outbound RF resource (ORFR) of the first peer base station, the first peer base station sends a peer busy indicator (PBI) message to all peer base station sharing a common group affiliation. The peer base stations that receive this PBI message transmit an inbound channel busy indicator (ICBI) message to their registered WCDs to block inbound communications from their registered WCDs. In one implementation, the ICBI message is addressed to all registered WCDs and blocks all inbound communications from registered WCDs unless the registered WCDs belong to a communication group that has been allocated an inbound RF resource (IRFR) and ORFR for communication with the first peer base station. In another implementation, the ICBI message is addressed to registered WCDs belonging to a specific communication group or set of specific communication groups, and blocks inbound communications from registered WCDs that belong to a specific communication group or set of specific communication groups. WCDs that receive the ICBI message can not transmit when they receive the ICBI message. As such, the ICBI messages can be used to selectively block inbound communications at some peer base stations, while allowing inbound communications from selected communication groups, and while allowing inbound communications from other communication groups at other peer base stations.

Some embodiments of the present invention relate to protocols, methods and apparatus for indicating availability of inbound RF resources (IRFRs) of fixed peer base stations that can be used, for example, in a two-way peer-to-peer communication system comprising a plurality of peer base stations including a first peer base station at a first site and a plurality of first wireless communication devices (WCDs) registered with the first peer base station. The plurality of first wireless communication devices (WCDs) include a first wireless communication device (WCD) affiliated with a first communication group having a first communication group identifier. When the first peer base station receives a first group packet, destined for WCDs belonging to the first communication group, from the first WCD, the first peer base station may allocate its last remaining IRFR for communications of the first communication group. In response, the first peer base station transmits a first peer busy indicator (PBI) to each of the other peer base stations that have at least one affiliated communication group in common with the first peer base station. The first PBI indicates that all outbound RF resources (ORFRs) of the first peer base station are currently in use. In response to the first PBI, the recipient peer base stations transmit, over-the-air (OTA), an inbound channel busy indictor (ICBI) to their registered WCDs. The registered WCDs interpret the inbound channel busy indictor (ICBI) to mean that no inbound communications are permitted since all IRFRs of the first peer base station are currently in use.

In one implementation the two-way peer-to-peer communication system includes a first peer base station at a first site, a second peer base station at a second site, a plurality of first wireless communication devices (WCDs) registered with the first peer base station including a first wireless communication device (WCD) affiliated with a first communication group, and a plurality of second WCDs registered with the second peer base station including a second wireless communication device (WCD) affiliated with the first communication group. The first peer base station has a first inbound radio frequency (RF) resource (IRFR) and a first outbound RF resource (ORFR) that has not yet been allocated, and a second IRFR and a second ORFR that have been allocated for communications of the second communication group. When the first peer base station receives a first group packet (destined for WCDs belonging to the first communication group) from the first WCD, the first peer base station allocates the first IRFR and the first ORFR for communications of the first communication group, and determines that it has no additional IRFRs or ORFRs available for allocation of another communication group. The first peer base station then determines which of the other peer base stations have at least one affiliated communication group in common with the first peer base station. For instance, in this example, the second peer base station is also affiliated with the first communication group. The first peer base station then transmits a peer busy indicator (PBI) to each of the other peer base stations that have at least one affiliated communication group in common with the first peer base station (including the second peer base station). The first PBI indicates that all IRFRs and ORFRs of the first peer base station are currently in use since the first peer base station is busy supporting communications associated with the first communication group and the second communication group. The recipient peer base stations will then interpret the first PBI as a trigger to send an Inbound channel busy indicator (ICBI) to their registered WCDs to indicate that all their ORFRs of the are occupied and that inbound communications from the WCDs can not be supported.

Embodiments of the present invention can apply to a number of network configurations. Prior to describing some embodiments with reference to FIGS. 3-6, one example of a network configuration in which these embodiments can be applied will now be described with reference to FIG. 1.

FIG. 1 is a block diagram which illustrates a wide area peer-to-peer (WAPP) communications network 100 used to implement a two-way peer-to-peer communication system that includes a plurality of peer base stations 132, 134, 136, 138 coupled to one another over an IP network 140, and a plurality of wireless communication devices (WCDs) 102, 104, 106, 108, 110, 112, 114, 116, 118, 120. Examples of such two-way peer-to-peer communication systems are described with reference to a number of standards. Several standards have been developed or are continuing to be developed that relate to digital two-way radio systems, and these standards describe techniques for improving spectral efficiency. Examples of such standards include, the Terrestrial Trunked Radio (TETRA) Standard of the European Telecommunications Standards Institute (ETSI), Project 25 of the Telecommunications Industry Association (TIA) and ETSI's digital mobile radio (DMR) Tier-2 Standard, which are incorporated by reference herein in their entirety. The TETRA standard is digital standard used to support multiple talk groups on multiple frequencies, including one-to-one, one-to-many and many-to-many calls. The TETRA standards and DMR standards have been and are currently being developed by the European Telecommunications Standards Institute (ETSI). The ETSI DMR Tier-2 standard is yet another digital radio standard that describes such two-way peer-to-peer communication system. Any of the TETRA standards or specifications or DMR standards or specifications referred to herein may be obtained at http://www.etsi.org/WebSite/Standards/StandardsDownload.aspx or by contacting ETSI at ETSI Secretariat, 650, route des Lucioles, 06921 Sophia-Antipolis Cedex, FRANCE. Project 25 defines similar capabilities, and is typically referred to as Project 25 Phase I and Phase II. Project 25 (P25) or APCO-25 refer to a suite of standards for digital radio communications for use by federal, state/province and local public safety agencies in North America to enable them to communicate with other agencies and mutual aid response teams in emergencies. The Project 25 (P25) specifies standards for the manufacturing of interoperable digital two-way wireless communications products. Developed in North America under state, local and federal representatives and Telecommunications Industry Association (TIA) governance, P25 is gaining worldwide acceptance for public safety, security, public service, and commercial applications. The published P25 standards suite is administered by the Telecommunications Industry Association (TIA Mobile and Personal Private Radio Standards Committee TR-8). Any of the P25 standards or specifications referred to herein may be obtained at TIA, 2500 Wilson Boulevard, Suite 300, Arlington, Va. 22201.

Notably, the two-way peer-to-peer communication system does not include a centralized controller, and the peer base stations 132, 134, 136, 138 can communicate with each other without communicating through a traditional centralized call controller used in dispatch communication systems, such as a Zone Controller or Comparator. As such, the term "peer base station" as used herein refers to a base station that is designed to communicate with another peer base station without utilizing a centralized controller. The network 100 illustrated in FIG. 1 is a simplified representation of one particular network configuration, and many other network configurations are possible. Although not illustrated in FIG. 1, it will be appreciated by those skilled in the art that the network can include fewer or additional peer base stations 132, 134, 136, 138, and fewer or additional WCDs 102, 104, 106, 108, 110, 112, 114, 116, 118, 120.

Each WCD 102-120 can belong to a communication group (communication group A (CGA), CGB, CGC, CGD, . . . , CGX) which has its own communication group identifier. Each of the members of a particular communication group (CGA, CGB, CGC, CGD, . . . , CGX) share a communication group identifier that distinguishes those WCDs from other WCDs in the network that do not belong to the communication group. The WCDs belonging to a particular communication group are authorized to receive communications intended for that particular communication group. For example, WCD 1 102 belongs to or is a member or "affiliate" of communication group A (CGA), whereas WCD 3 106 belongs to or is a member or "affiliate" of communication group B (CGB). Upon coming within communication range of a particular peer base station 132-138, each WCD registers with that particular peer base station. When a WCD associates with a particular peer base station, the WCD registers its device identifier (e.g., MAC address) and its communication group identifier (CGI) with that particular peer base station. The peer base stations communicate their registered CGIs to each other. This way, a particular peer base station "affiliates" with all communication groups that it has received CGIs for (from WCDs), and other peer base stations will send or push any group communications affiliated with that particular peer base station to the particular peer base station so that the particular peer base station can then transmit those group communications (associated with the WCD's CGI) over the air to the WCD. Each peer base station 132-138 then becomes "affiliated" with each of the communication groups that have been registered with that particular peer base station (i.e., for each of the communication groups of its registered WCDs). The peer base stations 132-138 can exchange affiliation information with each other. For example, when a WCD 102 register/affiliates to particular peer base station 132, then that particular peer base station 132 can provide its affiliation information to all other peer base stations 134-138 (or at least those known to have an affiliation with the same communication group or groups that have been affiliated at the particular peer base station 132). This way each peer base station 132-138 knows where other member WCDs of the particular communication group are located. For example, peer base station 132 knows that WCD 104 (that belongs to the particular communication group (CGA)) is located at peer base station 134.

In one implementation of the network 100, each particular peer base station (e.g., peer base station 1 132) and WCD (e.g., WCD 102) can communicate with one another using an "inbound" 25 kilo Hertz (kHz) frequency band or channel and an "outbound" 25 kHz frequency band or channel. As used herein, the term "inbound" refers to a communication originating from a portable wireless communication device that is destined for a fixed peer base station, whereas the term "outbound" refers to a communication originating from a fixed peer base station that is destined for a portable wireless communication device.

It is desirable to improve or increase "spectral efficiency" of such systems so that more end-users can communicate more information in a given slice of RF spectrum. In some two-way digital radio systems, a particular channel, such as the 25 kHz channel described above, that historically carried a single call at a given time can be divided to allow for a single channel to carry two (or more) calls at the same time. In the context of the implementation described above, for instance, the 25 kHz inbound and outbound sub-channels can be further divided using either Frequency-Division Multiple Access (FDMA) or Time-Division Multiple Access (TDMA) technologies to increase the number of WCDs that can simultaneously utilize those sub-channels.

FDMA splits the channel frequency into two smaller sub-channels that can carry separate calls side-by-side. For example, Project 25 Phase I uses 12.5 kHz channels and currently uses FDMA for both trunked and conventional digital systems. In such implementations, a single 25 kHz channel can be divided into a 12.5 kHz outbound sub-channel for use by the peer base station when communicating to one of its registered WCDs and a 12.5 kHz inbound sub-channel for use by one of the registered WCDs when communicating with its peer base station. In still other implementations, the inbound 12.5 kHz sub-channel can be further divided into two 6.25 kHz sub-sub-channels to allow two WCDs to communicate with their peer base station at any given time using different 6.25 kHz frequency segments of the inbound sub-channel, and the outbound 12.5 kHz sub-channel can also be divided into two 6.25 kHz sub-sub-channels for communications from the peer base station to the two WCDs.

By contrast, TDMA preserves the full channel width, but divides a channel into alternating time slots that can each carry an individual call. For example, Project 25 Phase II will add two-slot TDMA capabilities for digital trunked radio and the ETSI DMR Tier-2 standard calls for two-slot TDMA in 12.5 kHz channels. For instance, in the example described above, use of the 12.5 kHz inbound sub-channel can be further divided into two alternating time slots so that a particular WCD can use the entire 12.5 kHz inbound sub-channel during a first time slot to communicate with the peer base station, and another portable communication device can use the entire 12.5 kHz inbound sub-channel during a second time slot to communicate with the peer base station. Similarly, use of the 12.5 kHz outbound sub-channel can also be divided into two alternating time slots so that the particular peer base station can use the entire 12.5 kHz outbound sub-channel to communicate with a particular wireless communication device (or communication group of wireless communication devices) during a first time slot, and can use the entire 12.5 kHz outbound sub-channel to communicate with another particular wireless communication device (or another communication group of wireless communication devices) during a second time slot.

As can be seen from the following description, regardless of the multiple access technique that is implemented, the RF resources available for communicating between a base station and its associated wireless communication devices are limited. As used herein, the term "RF resources" refers to a sub-sub-channel or a time slot within a sub-channel. One example of an RF resource is a time slot in TDMA-based systems, and another example is a frequency channel in FDMA-based systems. At any given time, a single RF resource can be allocated to either a communication group (e.g., one WCD communicating with two or more other WCDs) or a communication pair (e.g., two WCDs communicating only with each other).

Figure 2:
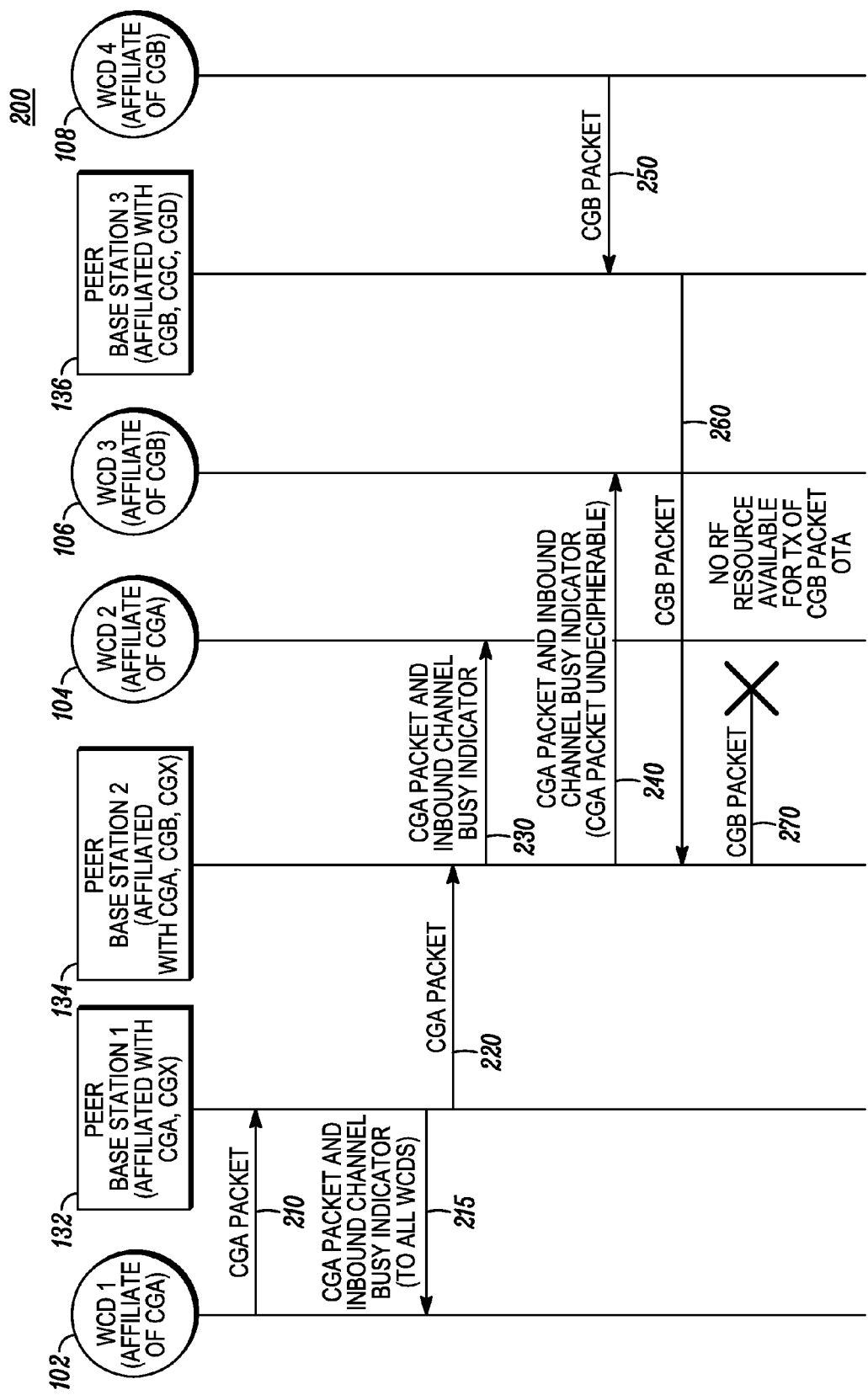
FIG. 2 is a communication flow diagram which illustrates distribution of information during a group communication from a wireless communication device (WCD) at one peer base station to other peer base stations and other wireless communication devices (WCDs) at the other peer base stations in the communications network of FIG. 1.

FIG. 2 is a communication flow diagram which illustrates distribution of information during a group communication from a wireless communication device (WCD) at one peer base station to other peer base stations and other wireless communication devices (WCDs) at the other peer base stations in the communications network of FIG. 1. For purposes of the description that follows, each peer base station has two IRFRs and two ORFRs available for use by two of its registered WCDs. However, in other implementations, each peer base station can have more than two IRFRs and more than two ORFRs available. In the example illustrated in FIG. 1, communication group x (CGx) is using one of the IRFRs and one of the ORFRs at peer base station 1 132 and one of the IRFRs and one of the ORFRs at peer base station 1 132; communication group x (CGx) is also using one of the IRFRs and one of the ORFRs at peer base station 2 134. Thus, in the descriptions that follow, it is presumed that peer base station 1 132 has only one remaining IRFR and only one remaining ORFR available since the others are being used by communication group x (CGx), and that peer base station 1 132 and peer base station 2 134 each have only one remaining IRFR and only one remaining ORFR available since the other is being used by communication group x (CGx).

As illustrated by communication 210, peer base station 1 132 receives a communication group A (CGA) packet (referred to herein as "CGA packet" which can be a single packet or multiple packets) that is destined for WCDs that belong to (or are "affiliates" or "members of") CGA. The CGA packet is intended for WCDs having a communication group identifier which indicates that those WCDs are associated with CGA. In this particular example, WCD 2 104 is the only other WCD that belongs to (or is "affiliated with") CGA (CGA). In this particular example, peer base station 1 132 determines that it and peer base station 2 134 are "affiliated" with CGA. In this example, CGA packet(s) consume the second IRFR of peer base station 1 132 such that peer base station 1 132 has no remaining IRFRs for use by other WCDs (not belonging to CGX or CGA). As illustrated by communication 215 in FIG. 2, peer base station 1 132 transmits or "repeats" the CGA packet OTA for reception by any members of CGA that are located at its site and within communication range along with an ICBI (inbound channel busy indicator). In this embodiment, an ICBI (inbound channel busy indicator) is a busy indicator that is sent from a peer base station over-the-air (OTA) to one or more WCDs within communication range of that peer base station. An ICBI (inbound channel busy indicator) is used to indicate that the peer base station is presently busy and that recipient WCDs are not to attempt inbound communications to their peer base station. In one implementation, the ICBI (inbound channel busy indicator) comprises one or more bits of a common announcement channel (CACH) that is transmitted over-the-air (OTA) by the peer base station 1 132 as part of the outbound bit stream transmitted to its associated WCDs. In such an implementation, the CACH occurs in the outbound communication stream between adjacent time slots, and each of the WCDs regularly monitors the CACH regardless of which communication group they belong to. WCDs that are already transmitting inbound communications to peer base station 132, such as WCD 102 and WCD 118, disregard or ignore the ICBI since those WCDs were allowed to initiate their inbound communications before the inbound busy indicator bits were set. Other WCDs (not illustrated) that receive the ICBI interpret these bits as an indication to "hold off" and not send inbound communications to the peer base station 1 132 since all IRFRs of the peer base station 1 132 are presently busy.

As illustrated in FIG. 2 by communication 220, the peer base station 1 132 transmits the CGA packet to each of the other peer base stations that are affiliated with CGA (i.e., have at least one WCD that belongs to CGA), which in this example is the peer base station 2 134.

As illustrated by communications 230 and 240 of FIG. 2, the peer base station 2 134 transmits an outbound communication over-the-air (OTA) that includes the CGA packet and an ICBI (inbound channel busy indicator). For sake of simplicity, WCD 120 is not illustrated in FIG. 2; however, WCDs 104, 106, 120 (and other WCDs within range of peer base station 2 134) will all receive this outbound communication (to the extent they are within communication range of peer base station 2 134) even though WCD 120 is not illustrated. The CGA affiliate WCDs (e.g., WCD 2 104) process/decode the CGA packet while the other WCDs 106, 120 will not since they are not affiliated with CGA. For instance, in a TDMA-based system, only WCD 104 will decode information sent on a time slot reserved for CGA (i.e., must be listening at the same time the peer base station is transmitting), and the other WCDs would decode the time slot that pertains to them (if any). By contrast in a FDMA-based system, the WCDs 106, 120 will ignore any packets that are not addressed to their communication groups CGB, CGX. Each of the registered WCDs 104, 106, 120 will receive the ICBI (inbound channel busy indicator). The ICBI indicates to the recipient WCDs 104, 106 and 120 that the IRFRs for communicating to the peer base station 2 134 are "busy" or unavailable for communication at the present time. In other words, the recipient WCDs 104, 106 and 120 interpret the inbound channel busy indictor (ICBI) to mean that no inbound communications are permitted since all IRFRs of the peer base station 2 134 are currently in use.

As illustrated by communication 250 of FIG. 2, the WCD 4 108, which is affiliated with communication group B (CGB), can communicate a CGB packet to peer base station 3 136. Peer base station 3 136 is affiliated with CGB and is also affiliated with communication group C (CGC) and communication group D (CGD). Peer base station 2 134, which is out of ORFRs, is also affiliated with CGB. However, peer base station 3 136 is unaware that ORFRs are unavailable at peer base station 2 134. As illustrated by communication 260, when peer base station 3 136 transmits the CGB packet to other peer base stations affiliated with CGB, which includes only peer base station 2 134 in this example, peer base station 2 134 will not be able to repeat the CGB packet and transmit it OTA to its registered WCDs which include WCD 3 106, as illustrated by broken communication at 270. This is problematic since the user of WCD 4 108 is likely to assume that all members of CGB (including the user of WCD 3 106) are receiving the CGB packet when this is not so.

Figure 3:
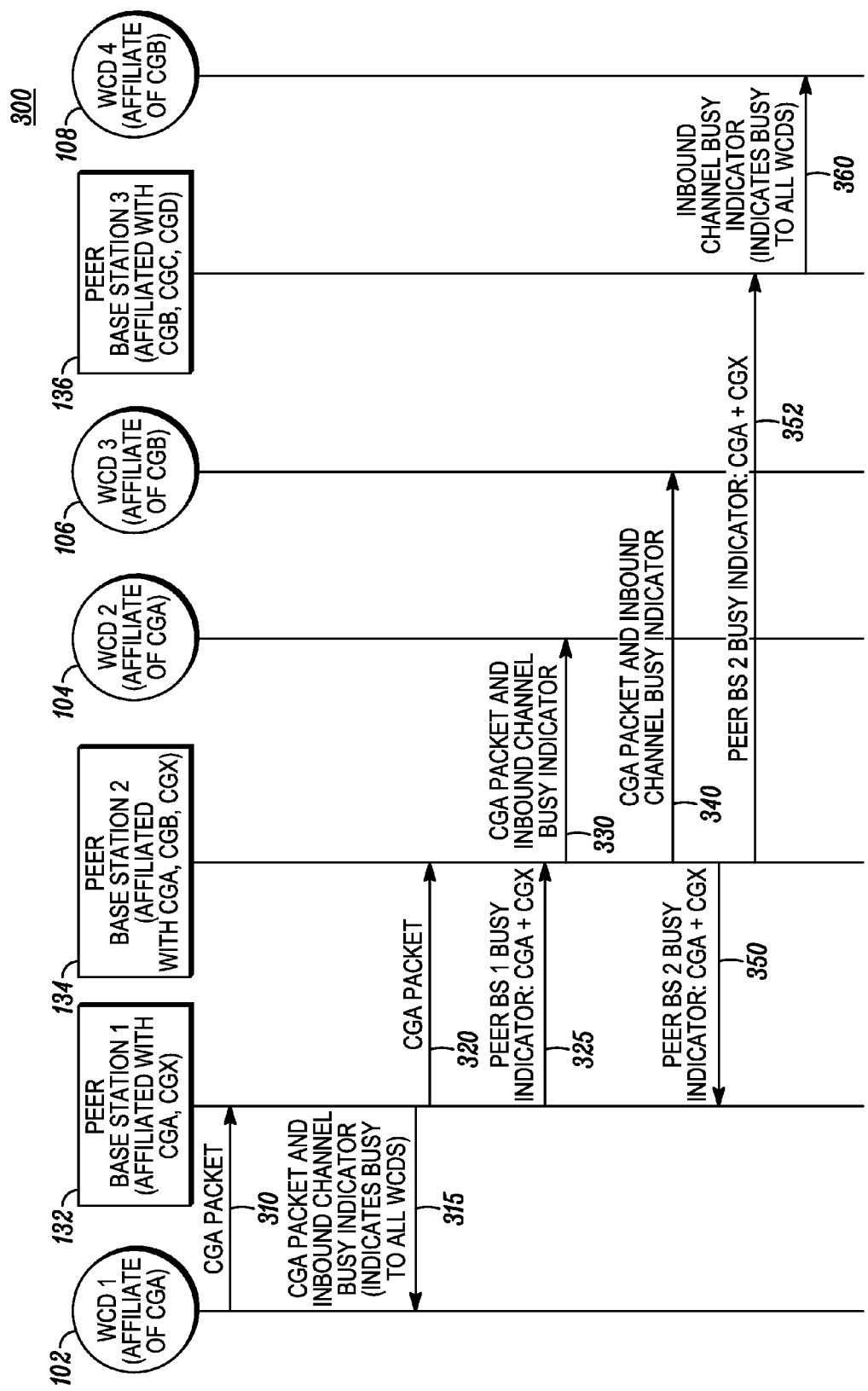
FIG. 3 is a communication flow diagram which illustrates a method for a peer base station to selectively indicate availability of its outbound RF resources to at least one of its peer base stations and its registered WCDs during a group communication scenario in a two-way peer-to-peer communication system in accordance with some embodiments.

FIG. 3 is a communication flow diagram which illustrates a method 300 for a peer base station 134 to selectively indicate availability of its ORFRs to at least one of its peer base stations 136 and its registered WCDs during a group communication scenario in a two-way peer-to-peer communication system in accordance with some embodiments. In the example illustrated in FIG. 3, like that illustrated in FIG. 1, communication group x (CGx) is using one of the IRFRs and one of the ORFRs at peer base station 1 132; communication group x (CGx) is also using one of the IRFRs and one of the ORFRs at peer base station 2 134. Thus, in the descriptions that follow, peer base station 1 132 has only one remaining IRFR available since the other is being used by communication group x (CGx), and peer base station 1 132 and peer base station 2 134 each have only one remaining ORFR available since the other is being used by communication group x (CGx).

As illustrated by communication 310, peer base station 1 132 receives a communication group A (CGA) packet (referred to herein as "CGA packet") that is destined for WCDs that belong to (or "are affiliates or members of") CGA. The CGA packet is intended for WCDs having a communication group identifier which indicates that those WCDs are associated with CGA. In this particular example, WCD 2 104 is the only other WCD that belongs to (or is "affiliated with") CGA (CGA). The peer base station 1 132 determines whether it has any other ORFRs available for communicating with WCDs at its site, and if not, identifies any of the other peer base stations that are "affiliated" with CGA and CGX. In this example, CGA packet(s) consume the second IRFR and second ORFR of peer base station 1 132 such that peer base station 1 132 has no remaining IRFRs or ORFR's for use by other WCDs (not belonging to CGX or CGA). In this particular example, peer base station 1 132 determines that it has no other IRFRs or ORFR's available for communicating with WCDs at its site, and determines that peer base station 2 134 is also affiliated with CGA and CGX.

As illustrated by communication 315 in FIG. 3, peer base station 1 132 transmits or "repeats" the CGA packet OTA for reception by any members of CGA that are located at its site and within communication range along with an ICBI (inbound channel busy indicator) that indicates that all IRFRs of the peer base station 1 132 are currently in use or "busy." Normally, the recipient WCDs 102, 118 would interpret the inbound channel busy indictor (ICBI) to mean that no inbound communications are permitted since all IRFRs of the peer base station 1 132 are currently in use. However, WCDs that are already transmitting inbound communications to peer base station 132, such as WCD 102 and WCD 118, disregard or ignore the ICBI since those WCDs were allowed to initiate their inbound communications before the ICBI was transmitted. To explain further, peer base station 132 was not transmitting the ICBI prior to WCD 118 initiating CGX communications and WCD 102 initiating CGA communications. As such, WCDs 102, 118 ignore or disregard this ICBI since peer base station 132 previously allowed (and is presently allowing) CGA, CGX communications that should be permitted to continue. In one implementation, the ICBI comprises one or more bits in a common announcement channel (CACH) that is transmitted OTA by the peer base station 1 132. Other WCDs (not illustrated) that receive the ICBI interpret these bits as an indication to "hold off" and not send inbound communications to the peer base station 1 132 since all IRFRs of the peer base station 1 132 are presently busy.

As illustrated in FIG. 3 by communication 320, the peer base station 1 132 transmits the CGA packet to each of the other peer base stations that are affiliated with CGA (i.e., have at least one WCD that belongs to CGA), which in this example is the peer base station 2 134.

Peer Busy Indicator

A "peer busy indicator (PBI)" is a busy indicator signal that is sent from a peer base station to one or more other peer base stations to indicate to the recipient peer base station that all ORFRs of the transmitting peer base station are "busy" and that the transmitting peer base station currently has no ORFRs available to support communications of additional communication groups. A PBI is sent from one peer base station to another peer base station only when the ORFRs of the transmitting peer base station are fully utilized to support existing communications. A PBI can be sent anytime there is a change in state regarding the peer base station's ORFRs. A PBI includes communication group identifiers (e.g., CGA, CGB, etc.) associated with communication groups for which ORFRs of the transmitting peer base station are unavailable. The recipient peer base station interprets the PBI as indicating that ORFRs of the transmitting peer base station are unavailable or "busy." A PBI triggers the recipient peer base station to generate and send an ICBI unless the recipient peer base station is already transmitting an ICBI, in which case the that recipient peer base station ignores the PBI and does not transmit an ICBI.

Figure 4:
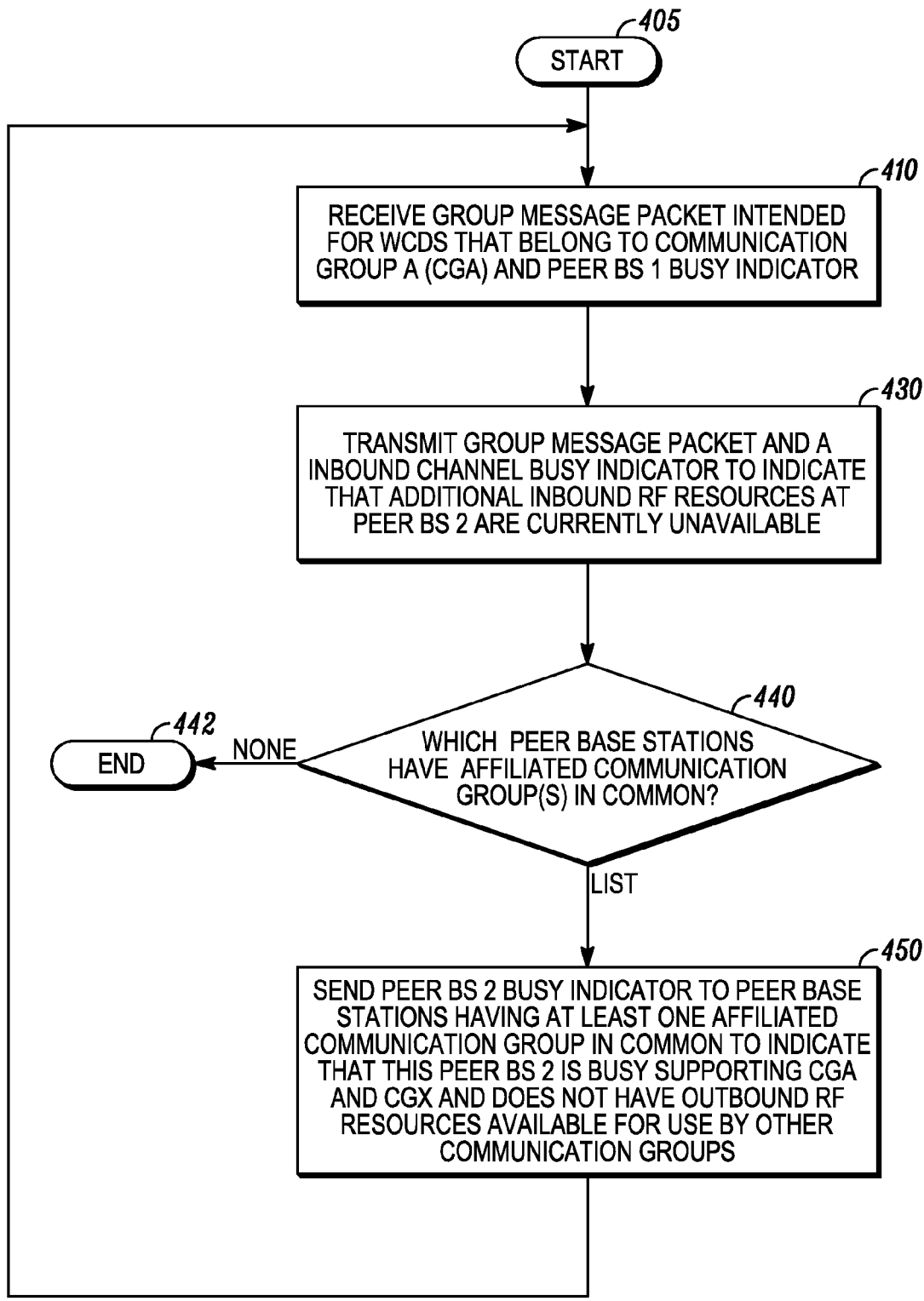
FIG. 4 is flow chart illustrating processing performed at a peer base station upon receiving a group communication packet and a peer busy indicator in accordance with some embodiments.

In one implementation, such as the embodiments illustrated in FIGS. 3 and 4, the ICBI (that is generated in response to the PBI) can be general and indicate that all ORFRs of the transmitting peer base station are unavailable. In this implementation, inbound communications on specified IRFRs will be blocked for all communication groups other than the communication groups that the IRFRs are already allocated to. In another implementation, such as that illustrated in FIGS. 5 and 6, the ICBI generated by the recipient peer base station can further specify communication group identifiers associated with communication groups that are currently using IRFRs of the transmitting peer base station. In yet another implementation, such as that illustrated in FIGS. 5 and 6, the ICBI (that is generated in response to the PBI) can indicate that IRFRs of the transmitting peer base station are unavailable for communications by one or more specified inactive communication groups of the transmitting peer base station (e.g., CGB). In this implementation, inbound communications on specified IRFRs will be blocked for particular or specific communication groups.

In one implementation, a peer busy indicator (PBI) includes (1) an identifier for the peer base station that generates the PBI, and (2) a first communication group identifier that specifies a first communication group that is using the last remaining IRFR of the peer base station. In another implementation, described below with reference to FIGS. 4-6, a peer busy indicator (PBI) includes (1) an identifier for the peer base station that generates the PBI, and (2) a first communication group identifier that specifies a first communication group that is using a first ORFR of the peer base station, and a second communication group identifier that is using a second ORFR of the peer base station. In some implementations, the PBI can also specify the specific ORFRs of the transmitting peer base station that are in use. In other implementations where the peer base station has more than two ORFRs, additional communication group identifiers can be included for communication groups that are using other ORFRs.

As illustrated in FIG. 3 by communication 325, the peer base station 1 132 also transmits a PBI (peer BS 1 busy indicator: CGA and CGX) to any other peer base stations that share a common affiliation (CGA, CGX) with the peer base station 1 132. In this particular example, the peer base station 1 132 transmits a PBI only to the peer base station 2 134 because its affiliated with CGA and CGX (i.e., has communication group affiliations in common with the peer base station 1 132). In this particular example, peer base station 1 132 transmits the PBI (peer BS 1 busy indicator: CGA and CGX) to the peer base station 2 134 to indicate that peer base station 1 132 is busy with communications involving CGA and CGX and has no other ORFRs available to support additional communications involving another communication group (CGB, CGC, CGD, . . . ). The recipient peer base station 2 134 interprets the PBI to mean that peer base station 1 132 has no additional ORFRs (i.e., supports two active communication groups, one of which is CGA and the other being CGX).

Peer base station 2 134 then performs processing as illustrated, for example, in FIG. 4. FIG. 4 is flow chart illustrating processing performed at a peer base station upon receiving a group communication packet and a PBI in accordance with some embodiments.

At step 410, the peer base station 2 134 receives the CGA packet and the PBI (peer BS 1 busy indicator: CGA and CGX).

At step 430, the peer base station 2 134 determines that it has no additional ORFRs available to support additional communication groups and transmits an outbound communication (or communications in some embodiments) that includes the CGA packet and an ICBI (inbound channel busy indicator) over-the-air (OTA) to WCDs within its communication range. For example, as illustrated by communications 330 and 340 of FIG. 3, the peer base station 2 134 transmits an outbound communication over-the-air (OTA) that includes the CGA packet and an ICBI (inbound channel busy indicator). All of the registered WCDs 104, 106, 120 will receive both CGA packet and the ICBI (inbound channel busy indicator). As explained above, only the CGA affiliate WCDs (e.g., WCD 2 104) process the CGA packet. The CGA affiliate WCDs are WCDs that are registered with peer base station 2 134 and belong to or are "affiliates of" CGA and thus destined to receive the CGA packet. The ICBI indicates to the recipient WCDs 104, 106, 120 (and any other WCDs in communication range of peer base station 2 134) that the IRFRs to the peer base station 2 134 are "busy" or unavailable for communication at the present time. In other words, the recipient WCDs interpret the inbound channel busy indictor (ICBI) to mean that inbound communications are not permitted unless the registered WCDs belong to one of the communication groups that have already been allocated an IRFR from inbound communications, which in the example illustrated in FIG. 1 are recipient WCDs 104, 120.

Referring again to FIG. 4, at step 440, peer base station 2 134 determines which of its peer base stations has at least one affiliated communication group in common with peer base station 2 134. In this particular example of one possible network configuration, the peer base station 1 132 is also affiliated with CGA (i.e., has CGA in common with peer base station 2 134) and peer base station 3 136 is also affiliated with communication group B (CGB) (i.e., has CGB in common with peer base station 2 134). If peer base station 2 134 determines that none of its peer base stations have an affiliated communication group in common at step 440, then the method 400 proceeds to step 442, where method 400 ends.

If peer base station 2 134 determines that at least one of its peer base stations have an affiliated communication group in common at step 440, then the method 400 proceeds to step 450. At step 450, the peer base station 2 134 sends a PBI (peer BS 2 busy indicator: CGA and CGX) to its peer base stations having at least one affiliated communication group in common with peer base station 2 134 (i.e., the other peer base stations that also support one of its affiliated communication groups). The PBI (peer BS 2 busy indicator: CGA and CGX) indicates to recipient peer base stations 132, 136 that the peer base station 2 134 is busy supporting communications of CGA and CGX and currently does not have ORFRs available for other new communications through peer base station 2 134. As illustrated via communications 350 and 352 of FIG. 3, in the example network configuration of FIG. 1, peer base station 2 134 sends the PBI (peer BS 2 busy indicator: CGA and CGX) to peer base station 1 132, which is also affiliated with CGA and CGX, and to peer base station 3 136, which is affiliated with CGD, CGC and CGB. The recipient peer base station 1 132 and peer base station 3 136 interpret the PBI to mean that peer base station 2 134 has no additional ORFRs (i.e., supports two active communication groups, one of which is CGA).

Upon receiving the PBI (peer BS 2 busy indicator: CGA and CGX), peer base station 1 132 ignores the PBI (peer BS 2 busy indicator: CGA and CGX) since it is already transmitting an ICBI (step 315) to its WCDs. Upon receiving the PBI (peer BS 2 busy indicator: CGA and CGX), as illustrated by communication 360 of FIG. 3, peer base station 3 136, sends an ICBI (inbound channel busy indicator) to all registered WCDs within communication range of peer base station 3 136. Although not illustrated, in this example, this includes at least WCDs 108, 110, 112, respectively, even though WCD 110, 112 are not illustrated in FIG. 3 for purposes of clarity. The ICBI (inbound channel busy indicator) transmitted by peer base station 3 136 stops recipient WCDs (including registered WCDs 108, 110, 112) that are affiliated with peer base station 3 136, but that are not part of one of the active communication groups CGA, CGX from transmitting inbound communications to their peer base station 3 136. Therefore this ICBI stops WCDs 110, 112 which are affiliated with CGC and CGD respectively from transmitting inbound, prohibiting inbound communication to WCDs 114 and 116, respectively. Notably although peer base station 2 134 also received the PBI (peer BS 2 busy indicator: CGA and CGX), peer base station 2 134 does not send a PBI to peer base station 4 138 because there were no common group affiliations. Therefore peer base station 4 138 does not transmit an ICBI. Notably, WCDs 114, 116 are still allowed to transmit packets inbound to peer base station 4 138 so that peer base station 4 138 may route those packets to peer base station 3 136 so that peer base station 3 136 can transmit those packets to WCDs 110, 112, respectively.

Thus, in contrast to the sequence illustrated in FIG. 2, each of the recipient WCDs including WCD 108 will be prevented or prohibited from communicating inbound CGB packets since peer base station 3 136 sent an ICBI to WCDs 108, 110, 112 on the outbound channel. Inbound communications from all of the recipient WCDs at peer station 3 136 including WCD 108 will be stopped until ORFRs are available at peer base station 2 134. This way all WCDs affiliated with communication group B (CGB) will have the same opportunity to receive the CGB packet(s).

Although not illustrated, when WCD 102 stops communicating CGA packets to peer base station 1 132, peer base station 1 132 no longer routes CGA packets to peer base station 2 134. Because an IRFR will become available at peer base station 1 132, peer base station 1 132 stops transmitting its ICBI and also stops sending the PBI (peer BS 2 busy indicator: CGA and CGX) to peer base station 2 134. Similarly, because an ORFR will become available at peer base station 2 134, peer base station 2 134 stops sending the PBI (peer BS 2 busy indicator: CGA and CGX) to peer base station 1 132, which is affiliated with CGA, and to peer base station 3 136, which is affiliated with CGB. In response, peer base station 1 132 and peer base station 3 136 stop transmitting their respective ICBIs.

Figure 5:
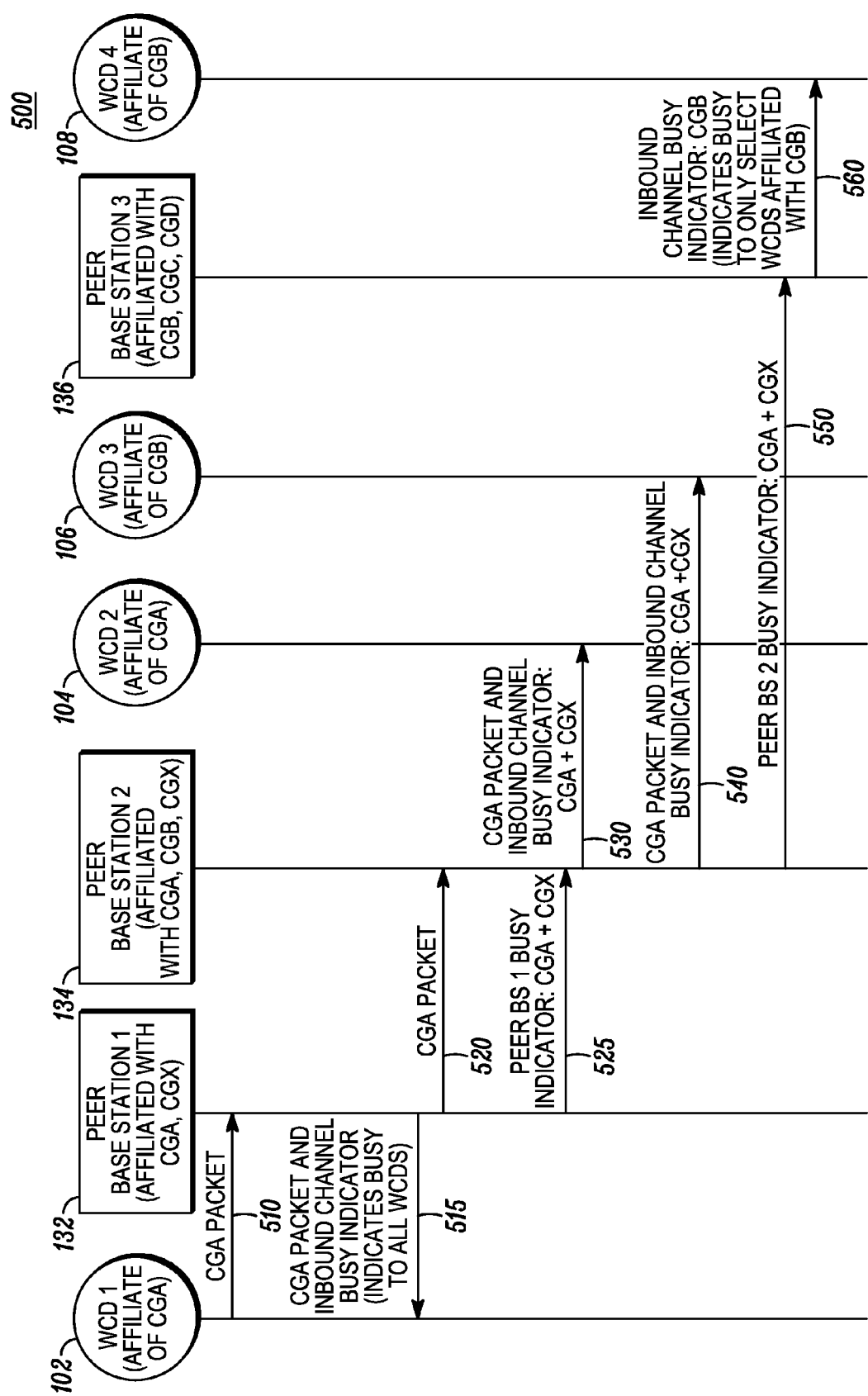
FIG. 5 is a communication flow diagram which illustrates a method for a peer base station to selectively indicate availability of its outbound RF resources to at least one of its peer base stations and some of its registered WCDs during a group communication scenario in a two-way peer-to-peer communication system in accordance with some embodiments.

FIG. 5 is a communication flow diagram which illustrates a method 500 for a peer base station 134 to selectively indicate availability of its ORFRs to at least one of its peer base stations 136 and some of its registered WCDs during a group communication scenario in a two-way peer-to-peer communication system in accordance with some embodiments. In the example illustrated in FIG. 5, like that illustrated in FIGS. 1-4, communication group x (CGx) is using one of the IRFRs at peer base station 1 132 and one of the outbound RF resources (ORFRs) at peer base station 1 132; communication group x (CGx) is also using one of the outbound RF resources (ORFRs) at peer base station 2 134. Thus, in the descriptions that follow, peer base station 1 132 has only one remaining IRFR available since the other is being used by communication group x (CGx), and peer base station 1 132 and peer base station 2 134 each have only one remaining ORFR available since the other is being used by communication group x (CGx). Moreover, in the embodiments illustrated in FIGS. 5 and 6, communications 510-525 of FIG. 5 are identical to communications 310-325 of FIG. 3. For sake of brevity, those communications will not be repeated in the description of FIG. 5 that follows.

Figure 6:
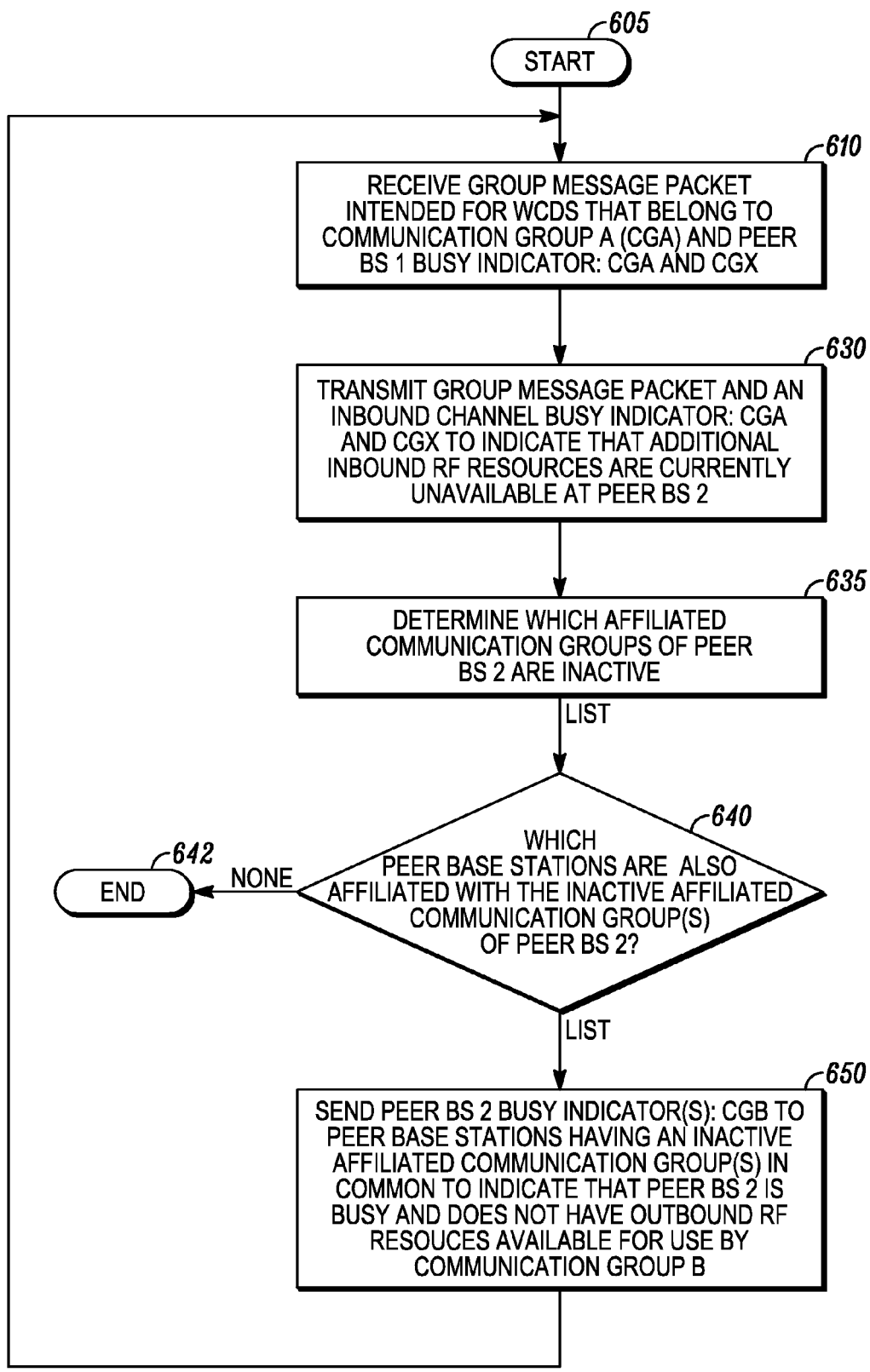
FIG. 6 is flow chart illustrating processing performed at a peer base station upon receiving a group communication packet and a peer busy indicator in accordance with some embodiments.

Upon receiving the PBI (peer BS 1 busy indicator: CGA and CGX) (transmitted at step 525), peer base station 2 134 then performs processing as illustrated, for example, in FIG. 6. FIG. 6 is flow chart illustrating processing 600 performed at a peer base station 134 upon receiving a group communication packet and a PBI (peer BS 1 busy indicator: CGA and CGX) in accordance with some embodiments.

At step 610, the peer base station 2 134 receives the CGA packet and the PBI (peer BS 1 busy indicator: CGA and CGX).

At step 630, the peer base station 2 134 determines that it has no additional ORFRs available to support additional communication groups and transmits an outbound communication (or communications in some embodiments) that includes the CGA packet and an ICBI over-the-air (OTA) to WCDs within its communication range. For example, as illustrated by communications 530 and 540 of FIG. 5, the peer base station 2 134 transmits an outbound communication over-the-air (OTA) that includes the CGA packet and an ICBI (inbound channel busy indicator: CGA and CGX). All of the registered WCDs 104, 106, 120 will receive both CGA packet and the ICBI (inbound channel busy indicator: CGA and CGX). As explained above, only the CGA affiliate WCDs (e.g., WCD 2 104) process the CGA packet. The CGA affiliate WCDs are WCDs that are registered with peer base station 2 134 and belong to or are "affiliates of" CGA and thus destined to receive the CGA packet. The ICBI (inbound channel busy indicator: CGA and CGX) indicates to the recipient WCDs 104, 106, 120 (and any other WCDs in communication range of peer base station 2 134) that the ORFRs and the IRFRs of the peer base station 2 134 are busy and therefore unavailable for use by other communication groups at the present time. In other words, the recipient WCDs 104, 106 and 120 interpret the inbound channel busy indictor (ICBI) to mean that no inbound communications are permitted since all IRFRs of the peer base station 2 134 are currently in use.

In this embodiment, peer base station 2 134 has determined that it has no additional ORFRs available, and can proactively "busy" its inactive communication groups in advance by sending PBIs to selected ones of its peer base stations that also are affiliated with those inactive communication groups. As illustrated in FIG. 6, at step 635, peer base station 2 134 determines and identifies which ones of its affiliated communication groups are currently inactive. Inactive communication groups are those that the peer base station 2 134 is affiliated with and that are not currently using any ORFRs and IRFRs of peer base station 2 134. In this particular example of one possible network configuration, the only inactive affiliated communication group of the peer base station 2 134 is CGB.

Method 600 then proceeds to step 640, where the peer base station 2 134 determines which ones of its peer base stations are also affilated with the inactive affiliated communication groups of peer base station 2 134. In other words, at step 640, peer base station 2 134 determines which of its peer base stations has at least one inactive affiliated communication group in common with peer base station 2 134. If peer base station 2 134 determines that none of its peer base stations have an inactive affiliated communication group in common at step 640, then the method 600 proceeds to step 642, where method 600 ends. In this particular example of one possible network configuration, peer base station 2 134 determines that communication group B (CGB) is its only inactive affiliated communication group, and further determines that peer base station 3 136 is also affiliated with CGB (i.e., has CGB in common with peer base station 2 134).

If peer base station 2 134 determines that one or more of its peer base stations have an inactive affiliated communication group in common at step 640, then the method 600 proceeds to step 650, where the peer base station 2 134 sends a PBI (peer BS 2 busy indicator: CGA and CGX) to peer base stations having an inactive affiliated communication group in common with peer base station 2 134. The PBI (peer BS 2 busy indicator: CGA and CGX) indicates that peer base station 2 134 does not have ORFRs available for use by other new communication groups (CGs) not already communicating via those IRFRs. This is illustrated in FIG. 5 by communication 550, where peer base station 2 134 sends a PBI (peer BS 2 busy indicator: CGA and CGX) to peer base station 3 136. The PBI (peer BS 2 busy indicator: CGA and CGX) indicates that peer base station 2 134 is currently unable to support communications associated with any other group. The recipient peer base station 3 136 interprets the PBI (peer BS 2 busy indicator: CGA and CGX) as will now be described below.

Although not illustrated in FIG. 5, upon receiving the PBI (peer BS 2 busy indicator: CGA and CGX) from peer base station 2 134, peer base station 3 136 determines which communication groups are affiliated with peer base station 2 134, and of those which ones of those communication groups are "active," and which ones (if any) are "inactive." In this particular example, peer base station 3 136 determines that communication groups CGA, CGB, CGX are affiliated with peer base station 2 134, and that of those, CGA and CGX are active and that CGB is inactive. In this particular example, CGB is the only inactive communication group affiliated with peer base station 2 134, and therefore communications involving CGB can not be supported by peer base station 2 134.

Peer base station 3 136 then determines which inactive communication groups affiliated with peer base station 2 134 are also affiliated with peer base station 3 136. In other words, peer base station 3 136 then determines whether it is affiliated with (or shares common affiliations with) any of the inactive communication groups supported by peer base station 2 134. In this example, peer base station 3 136 determines that it is also affiliated with CGB, which happens to be the only inactive communication group affiliated with peer base station 2 134, and generates an ICBI (inbound channel busy indicator: CGB). This ICBI (inbound channel busy indicator: CGB) include a list of one or more communication groups (i.e., CGB in this example) that are prohibited from sending inbound group communications to the peer base station 3 136.

As illustrated by communication 560 of FIG. 5, peer base station 3 136 sends an ICBI (inbound channel busy indicator: CGB) to all registered WCDs within communication range of peer base station 3 136. Although not illustrated, in this example, this includes at least WCDs 108, 110, 112, respectively, even though WCD 110, 112 are not illustrated in FIG. 5 for purposes of clarity. This ICBI (inbound channel busy indicator: CGB) indicates to the recipient WCDs 108, 110, 112 a list of one or more communication groups that are prohibited from sending inbound group communications to the peer base station 3 136. In other words, the recipient WCDs 108, 110 and 112 interpret the inbound channel busy indictor (ICBI) to mean that no inbound communications are permitted from WCDs affiliated with the communication groups that are listed since IRFRs of the peer base station 3 136 are currently in use. In this embodiment, only those WCDs affiliated with one of these inactive communication groups are prohibited from sending inbound group communications to the peer base station 3 136. In one implementation, the ICBI (inbound channel busy indicator: CGB) transmitted by peer base station 3 136 stops recipient WCD 4 108 from transmitting inbound communications to peer base station 3 136 since WCD 4 108 belongs to inactive communication group CGB. As will be explained in greater detail below, WCDs that are affiliated with any CG not specified in the list of inactive communication groups (i.e., CGB) are allowed to send inbound group communications to the peer base station 3 136. To explain further, in this embodiment, the ICBI (inbound channel busy indicator: CGB) prevents or disallows inbound communications from only those WCDs affiliated to CGB, and in this particular example stops inbound communications from registered WCD 108 to peer base station 3 136. Thus, in contrast to the embodiments illustrated in FIGS. 3 and 4, the ICBI (inbound channel busy indicator: CGB) prevents or prohibits selected groups of WCDs (i.e., WCD 108 of group CGB) from communicating inbound. In the example network of FIG. 1, the WCD 108 at peer base station 3 136 uses the list of inactive communication communication group identifiers (i.e., CGB) listed in the outbound ICBI to determine whether it belongs to one of an inactive communication group, and if so, then WCD 108 will not be allowed to transmit to that inactive communication group. Therefore, in this particular example, WCD 108 can not transmit inbound CGB packets. Inbound communications from WCD 108 will be disallowed until outbound RF resources are available at peer base station 2 134. This way all WCDs affiliated with CGB throughout the system 100 will have the same opportunity to receive any CGB packet(s).

In the embodiments illustrated in FIGS. 3 and 4, the ICBI sent by peer base stations in outbound signaling is general and applies to all inbound communications from all communication groups affiliated to the transmitting peer base station. By contrast, in the embodiments illustrated in FIGS. 5 and 6, the ICBI sent by peer base stations differs in that the ICBI is specific and applies only to inbound communications from a specific/particular communication group (or groups) affiliated to the transmitting peer base station. As such, the other WCDs 110, 112 are still permitted to communicate inbound CGC packets and CGD packets to peer base station 3 136. For instance, WCDs 110, 112 are still allowed to transmit packets inbound to peer base station 3 136. Inbound packets would be routed from peer base station 3 136 to peer base station 4 138 only so that peer base station 4 138 may transmit those packets to WCDs 114,116 respectively. In addition, WCDs 114, 116 may still transmit packets inbound to peer base station 4 138 so that peer base station 4 138 may route to peer base station 3 136 so that peer base station 3 136 may transmit those packets to WCDs 110, 112 respectively. Moreover, according to this embodiment, if it is assumed that there is another WCD (not illustrated) at peer base station 3 136 that is affiliated with communication group Y (CGY), this WCD would be permitted to communicate inbound CGY packet(s) since ICBI (inbound channel busy indicator: CGB) disallows only those WCDs affiliated to CGB.

As in the other embodiment, when WCD 102 stops communicating CGA packets to peer base station 1 132, peer base station 1 132 no longer routes CGA packets to peer base station 2 134. Because an ORFR will become available at peer base station 1 132, peer base station 1 132 stops transmitting its ICBI (at step 515) to its registered WCDs and also stops sending the PBI (peer BS 2 busy indicator: CGA and CGX) to peer base station 2 134 (at step 525). Likewise, because an RF resource will become available at peer base station 2 134, peer base station 2 134 stops sending the PBI (peer BS 2 busy indicator: CGA and CGX) to peer base station 3 136, which is affiliated with CGB. In response, peer base station 3 136 stops transmitting its ICBI (at step 560).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for indicating availability of outbound RF resources (ORFRs) of peer base stations in a communication system enabling group communications between a plurality of interconnected peer base stations including a first peer base station at a first site and a plurality of first wireless communication devices (WCDs) registered with the first peer base station including a first wireless communication device (WCD) affiliated with a first communication group of WCDs having a first communication group identifier, the method comprising:
   receiving, at the first peer base station from the first WCD, a first group packet destined for WCDs belonging to the first communication group of WCDs and allocating a last remaining ORFR at the first peer base station for communications of the first communication group of WCDs;
   transmitting, from the first peer base station, a first peer busy indicator (PBI) to each of the other peer base stations in the plurality that supports at least one WCD that is affiliated with a same communication group of WCDs as at least one WCD supported by the first peer base station, wherein the first PBI indicates all ORFRs of the first peer base station are currently in use; and
   transmitting, from each of the other peer base stations that receive the first PBI, an inbound channel busy indictor (ICBI) that prevents registered WCDs from transmitting inbound communications unless the registered WCDs belong to a communication group of WCDs that has already been allocated an inbound RF resource (IRFR).

2. The method according to claim 1, wherein the first peer base station has (1) a first ORFR and (2) a second ORFR allocated for communications of a second communication group of WCDs having a second communication group identifier, wherein the step of receiving, at the first peer base station from the first WCD, a first group packet destined for WCDs belonging to the first communication group of WCDs and allocating a last remaining ORFR for communications of the first communication group of WCDs, comprises:

in response to receiving, at the first peer base station from the first WCD, the first group packet destined for WCDs belonging to the first communication group of WCDs, allocating the first ORFR of the first peer base station for communications of the first communication group of WCDs;

determining, at the first peer base station, whether the first peer base station has additional ORFRs available for allocation to another communication group of WCDs; and determining, at the first peer base station when the first peer base station has no additional ORFRs available, which of the other peer base stations in the plurality support at least one WCD that is affiliated with a same communication group of WCDs as at least one WCD supported by the first peer base station.

3. The method according to claim 2, wherein the communication system further comprises: a second peer base station at a second site different from the first site, the second peer base station being coupled to the first peer base station over an internet-protocol (IP) network and being designed to communicate with the first peer base station without communicating through a centralized controller, and a plurality of second WCDs registered with the second peer base station including a second WCD that belongs to the first communication group of WCDs and a third WCD that belongs to the second communication group of WCDs, the method further comprising:

regularly exchanging WCD communication group affiliation information between the first peer base station and the second peer base station, wherein the WCD communication group affiliation information comprises communication group identifiers identifying communication groups with which each of the respective WCDs is affiliated with; and determining, at the first peer base station, which affiliated communication groups of WCDs are shared in common between the first peer base station and the second peer base station based on the exchanged WCD communication group affiliation information.

4. The method according to claim 2, wherein the first PBI further comprises:

a first identifier that identifies the first peer base station;

the first communication group identifier for the first communication group of WCDs that is using the first ORFR of the first peer base station; and the second communication group identifier for the second communication group of WCDs that is using the second ORFR of the first peer base station, wherein the first PBI indicates that the first peer base station is busy receiving a first inbound communication associated with the first communication group of WCDs and a second inbound communication associated with the second communication group of WCDs and that the first peer base station currently has no additional ORFRs available to support group communications associated with other communication groups of WCDs.

5. The method according to claim 1, further comprising:

transmitting, from the first peer base station to the plurality of first WCDs at the first site, a first inbound channel busy indicator (ICBI) that prevents each of the plurality of first WCDs from transmitting inbound communications to the first peer base station unless a respective one of the plurality of first WCDs belongs to a communication group of WCDs that has already been allocated an IRFR of the first peer base station.

6. The method according to claim 5, further comprising:

receiving the first ICBI over-the-air (OTA) at a particular one of the plurality of first WCDs at the first site; and the particular one of the plurality of first WCDs determining based on the first ICBI that no inbound communications are to be transmitted to the first peer base station.

7. The method according to claim 3, wherein a first ORFR of the second peer base station is allocated to the first communication group of WCDs and a second ORFR of the second peer base station is allocated to the second communicaton group, and wherein the first WCD and the second WCD of the first communication group of WCDs each have a first communication group identifier which indicates that the first WCD and the second WCD are associated with the first communication group of WCDs, and further comprising:

receiving, at the second peer base station, the first PBI that indicates that the first peer base station has no additional ORFRs available for use by other communication groups of WCDs;

determining, at the second peer base station, whether any ORFRs of the second peer base station are currently available;

determining, at the second peer base station when no additional ORFRs of the second peer base station are currently available, which of the other peer base stations in the plurality support at least one WCD that is affiliated with a same communication group of WCDs as at least on WCD supported by the second peer base station; and transmitting, from the second peer base station to the determined other peer base stations in the plurality a second PBI that indicates that the second peer base station is busy supporting inbound communications of the first communication group of WCDs and the second communication group of WCDs, and that the second peer base station has no additional ORFRs available for use by other communication groups of WCDs.

8. The method according to claim 7, wherein the second PBI further comprises:

a second identifier that identifies the second peer base station, the first communication group identifier for the first communication group of WCDs that is using the first ORFR of the second peer base station, and the second communication group identifier for the second communicaton group that is using the second ORFR of the second peer base station.

9. The method according to claim 7, wherein the step of transmitting, from each of the other peer base stations that receive the first PBI, an ICBI that prevents registered WCDs from transmitting inbound communications to respective ones of the other peer base stations unless the registered WCDs belong to a communication group of WCDs that has already been allocated an IRFR comprises:

transmitting, from the second peer base station to the second WCDs at the second site, a second ICBI that prevents the second WCDs from transmitting inbound communications to the second peer base station unless a particular one of the second WCDs belongs to a communication group of WCDs that has already been allocated an IRFR with the second peer base station.

10. The method according to claim 7, wherein the two-way peer-to-peer communication system further comprises a third peer base station at a third site, and a second plurality of wireless communication devices (WCDs) registered with the third peer base station including a fourth wireless communication device (WCD) registered with the third peer base station and affiliated with a third communication group of WCDs, the method further comprising:

receiving, at the first peer base station and the third peer base station, the second PBI that indicates that all ORFRs of the second peer base station are currently in use; and transmitting over-the-air (OTA), from the third peer base station to each of the second plurality of WCDs registered with the third peer base station including the fourth WCD, a third ICBI that prevents the registered WCDs of the third peer base station from transmitting inbound communications to the third peer base station unless a particular one of the registered WCDs belongs to a communication group of WCDs that has already been allocated an IRFR with the third peer base station.

11. The method according to claim 3, wherein the first peer base station is designed to:

communicate over a particular frequency band comprising: an outbound sub-channel for transmitting information to WCDs and an inbound sub-channel for receiving information from WCDs, wherein the inbound sub-channel comprises the first IRFR and the second IRFR and wherein the outbound sub-channel comprises a first ORFR and a second ORFR.

12. The method according to claim 11, wherein the first IRFR is a first portion of the inbound sub-channel and the second IRFR is a second portion of the inbound sub-channel, and wherein the first ORFR is a first portion of the outbound sub-channel and the second ORFR is a second portion of the outbound sub-channel.

13. The method according to claim 12, wherein the particular frequency band has a 25 kiloHertz bandwidth, wherein the inbound sub-channel has a 12.5 kiloHertz bandwidth, wherein the first portion of the inbound sub-channel has a 6.25 kiloHertz bandwidth, wherein the second portion of the inbound sub-channel has a 6.25 kiloHertz bandwidth, wherein the outbound sub-channel has a 12.5 kiloHertz bandwidth, wherein the first portion of the outbound sub-channel has a 6.25 kiloHertz bandwidth, and wherein the second portion of the outbound sub-channel, has a 6.25 kiloHertz bandwidth.

14. The method according to claim 11, wherein the first IRFR is a first inbound time-slot defined within the inbound sub-channel, wherein the second IRFR is a second inbound time-slot defined within the inbound sub-channel, wherein the first ORFR is a first outbound time-slot defined within the outbound sub-channel, and wherein the second ORFR is a second outbound time-slot defined within the outbound sub-channel.

15. The method according to claim 14, wherein the particular frequency band has a 25 kiloHertz bandwidth, wherein the inbound sub-channel has a 12.5 kiloHertz bandwidth and wherein the outbound sub-channel has a 12.5 kiloHertz bandwidth.

16. The method according to claim 3, further comprising:

receiving, at the second peer base station, the first PBI;

determining, at the second peer base station, whether any ORFRs of the second peer base station are currently available;

determining, at the second peer base station when no additional ORFRs of the second peer base station are currently available, which affiliated communication groups of WCDs of the second peer base station are inactive, wherein affiliated communication groups of WCDs of the second peer base station that are inactive are those with which the second peer base station is affiliated and are not currently using any ORFRs of the second peer base station;

determining, at the second peer base station, which of the other peer base stations are commonly affiliated with the at least one of the inactive affiliated communication group of WCDs of the second peer base station; and transmitting, from the second peer base station to the other peer base stations that have at least one affiliated communication group of WCDs that corresponds to at least one of the inactive affiliated communication groups of WCDs of the second peer base station, a second PBI that indicates that the second peer base station has no additional ORFRs for supporting communications of the at least one inactive affiliated communication group of WCDs of the second peer base station.

17. The method according to claim 16, wherein the second PBI further comprises:

a second identifier that identifies the second peer base station, the first communication group identifier for the first communication group of WCDs that is using the first ORFR of the first peer base station and the second communication group identifier for the second communication group of WCDs that is using the second ORFR of the first peer base station.

18. The method according to claim 16, further comprising:

transmitting over-the-air (OTA), from the second peer base station to second WCDs at the second site, a second ICBI comprising:

the first communication group identifier for the first communication group of WCDs that is using the first ORFR of the first peer base station; and the second communication group identifier for the second communication group of WCDs that is using the second ORFR of the first peer base station, wherein the second ICBI prevents the second WCDs from transmitting inbound communications to the second peer base stations unless a particular one of the second WCDs belongs to a communication group of WCDs that has already been allocated an IRFR with the second peer base station.

19. The method according to claim 17, wherein the two-way peer-to-peer communication system further comprises a third peer base station at a third site, and a fourth wireless communication device (WCD) registered with the third peer base station and affiliated with the second communication group of WCDs, the method further comprising:

receiving, at the third peer base station, the second PBI;

determining, at the third peer base station based on the second PBI, which communication groups of WCDs are affiliated with second peer base station are inactive;

determining, at the third peer base station, which communication groups of WCDs affiliated with the third peer base station are shared in common with the inactive communication groups of WCDs affiliated with second peer base station;

generating, at the third peer base station, a third ICBI that includes one or more communication group identifiers associated with communication groups of WCDs affiliated with the third peer base station that are shared in common with the inactive communication groups of WCDs affiliated with second peer base station, wherein the communication groups of WCDs affiliated with the third peer base station that are shared in common with the inactive communication groups of WCDs affiliated with second peer base station are prohibited from sending inbound group communications to the third peer base station; and transmitting over-the-air (OTA), from the third peer base station to WCDs at the third site including the fourth WCD, the fourth ICBI comprising the communication group identifiers of the inactive affiliated communication groups of WCDs, wherein the fourth ICBI indicates which affiliated WCDs of the third peer base station are not to transmit inbound communications to the third peer base station unless a particular one of the registered WCDs belong to a communication group of WCDs that has already been allocated an IRFR with the third peer base station.

20. The method according to claim 19, wherein the recipient WCDs registered with the third peer base sation which are not affiliated with the inactive communication group of WCDs are permitted to send inbound communications to the third peer base station.

* * * * *

UNITED STATES PATENT AND TRADEMARK OFFICE
CERTIFICATE OF CORRECTION

| | | |
|---|---|---|
| PATENT NO. | : 8,046,016 B2 | Page 1 of 1 |
| APPLICATION NO. | : 12/199338 | |
| DATED | : October 25, 2011 | |
| INVENTOR(S) | : LoGalbo et al. | |

It is certified that error appears in the above-identified patent and that said Letters Patent is hereby corrected as shown below:

In the Claims:

In Column 20, Line 13, in Claim 7, delete "communicaton" and insert -- communication --, therefor.

In Column 20, Line 48, in Claim 8, delete "communicaton" and insert -- communication --, therefor.

In Column 24, Line 5, in Claim 20, delete "sation" and insert -- station --, therefor.

Signed and Sealed this
Twenty-first Day of May, 2013

Teresa Stanek Rea
*Acting Director of the United States Patent and Trademark Office*